United States Patent
Pollowitz et al.

(10) Patent No.: US 9,717,983 B1
(45) Date of Patent: Aug. 1, 2017

(54) RACE MANAGEMENT SYSTEM

(71) Applicants: Michael Pollowitz, Shoreline, WA (US); Jacob Pollowitz, Shoreline, WA (US)

(72) Inventors: Michael Pollowitz, Shoreline, WA (US); Jacob Pollowitz, Shoreline, WA (US)

( * ) Notice: Subject to any disclaimer, the term of this patent is extended or adjusted under 35 U.S.C. 154(b) by 238 days.

(21) Appl. No.: 14/206,862

(22) Filed: Mar. 12, 2014

Related U.S. Application Data

(60) Provisional application No. 61/785,250, filed on Mar. 14, 2013.

(51) Int. Cl.
*G06F 17/00* (2006.01)
*A63F 13/00* (2014.01)

(52) U.S. Cl.
CPC .................. *A63F 13/005* (2013.01)

(58) Field of Classification Search
CPC ............. A63F 13/12; A63F 13/65; A63F 9/14
See application file for complete search history.

(56) References Cited

U.S. PATENT DOCUMENTS

| | | | | |
|---|---|---|---|---|
| 2001/0016509 A1* | 8/2001 | Kusuda | ................... | A63F 9/143 463/6 |
| 2003/0078087 A1* | 4/2003 | Kojima | ............... | G07F 17/3288 463/6 |
| 2009/0088256 A1* | 4/2009 | Kotsugai | ................. | A63F 13/12 463/42 |

OTHER PUBLICATIONS

Wayback Machine, InCompass, Sep. 22, 2011, https://web.archive.org/web/20110922103512/http://incompass-solutions.com/productsDisplay.asp.*
Blood Horse, "InCompass Launches Mobile Rundown App", by Blood Horse Staff, Jan. 26, 2011, http://www.bloodhorse.com/horse-racing/articles/60984/incompass-launches-mobile-rundown-app.*
Wayback Machine, Equibase, Sep. 14, 2011, https://web.archive.org/web/20110914114028/http://www.equibase.com/premium/eqpInToday.cfm.*
Wayback Machine, Equibase, Sep. 14, 2011, https://web.archive.org/web/20110914075141/http://www.equibase.com/static/horsemen/horsemenarea.html?SAP=TN.*

* cited by examiner

*Primary Examiner* — James S McClellan
*Assistant Examiner* — Kevin Carter
(74) *Attorney, Agent, or Firm* — Christensen O'Connor Johnson Kindness PLLC

(57) ABSTRACT

A race management system is described. In one aspect, a race is chosen and an interested/committed selection is made. If "interested" is selected, the race management system prioritizes races, updates and displays a race menu, and updates and displays an interested/committed list. A TEL (Tentative Entry List) database can notify trainers when they have horses that are interested in a race that has made the TEL. Updates are sent to and/or received from the TEL database. If "committed" is selected, the race management system executes similar steps as if "interested" was selected. In another aspect, a one-day TEL template is uploaded, protocol races are inserted into the template, and prioritized races are transferred from the TEL database to the template. Based on this prioritization, the one-day TEL is constructed.

20 Claims, 8 Drawing Sheets

FIG. 2

THE RACING SECRETARY
*WHERE TECHNOLOGY MEETS TRADITION*

TRAINER'S HOMEPAGE | TENTATIVE ENTRY LIST (TEL) | RACE MENU | YOUR STABLE | STAKES SCHEDULE | MASTER CONTACT LIST | MY ACCOUNT | ? | SIGN OUT | GENERAL INFORMATION

PROFILE

"HORSE 4" (KY)
B, M, FOALED MARCH 4, 2007
("HORSE 1" – "HORSE 2,"
BY "HORSE 3")

MEDICATION
- BUTE ☑
- FIRST TIME LASIX ○
- LASIX ON ○
- LASIX OFF ●

EQUIPMENT
- BLINKERS ON ○
- BLINKERS OFF ○
- NO BLINKERS ●

OTHER
- CHEEK PIECE ☐
- CORNELL COLLAR ☐
- FRONT WRAPS ☐
- NASAL STRIP ☐
- NO SHOES ☐
- NO WHIP ☐
- SADDLE STRAP ☐

| RACE DESCRIPTION | TOTAL # | I/C |
|---|---|---|
| CLAIMING $7,500 (3&UP F&M) @ 6F | 5 | ☐/☐ |
| $50,000 HANDICAP (3&UP F&M) 2 6F | 10 ☆ | ☑/☐ |
| OPT. CLAIMING $50,000 (3$UP F&M) @ 5.5F | 5 ☆ | ☑/☐ |
| CLAIMING $7,500 (3&UP F&M) @ 5.5F | 5 | ☑/☐ |
| ......... | ... | |
| ......... | ... | |
| ......... | ... | |

MORE RACES | RACE MENU

☆ = ON TEL

CURRENT STATUS
- RACE READY ○
- NOT RACE READY ●
- RESTING FROM RACE ○
- VET'S LIST ○
- STEWARD'S LIST ○

JOCKEY SELECTION LIST
1: "JOCKEY 1" (VL)
2: "JOCKEY 2" (DS)
3: "JOCKEY 3" (SELF)
4: "JOCKEY 4" (KD)
5: "JOCKEY 5" (KG)
6: "JOCKEY 6" (KD)
7: "JOCKEY 7" (DS)
............
"JOCKEY 8" (KG)
"JOCKEY 9" (KD)
"JOCKEY 10" (SELF)

FIG. 3

THE RACING SECRETARY
*WHERE TECHNOLOGY MEETS TRADITION*

1-DAY TEL

TRAINER'S HOMEPAGE | TENTATIVE ENTRY LIST (TEL) | RACE MENU | YOUR STABLE | STAKES SCHEDULE | MY ACCOUNT | ? | SIGN OUT | MASTER CONTACT LIST | GENERAL INFORMATION

FIFTY-FIFTH DAY – SATURDAY, JULY 24, 2010
(ENTRIES CLOSE WEDNESDAY, JULY 21, 2010)

| RACE TYPE | RACE DESCRIPTION | # COMMITTED (YOUR STABLE) | TODAY'S COMMITTED RUNNERS |
|---|---|---|---|
| PROTOCOL 1 | $50,000 HASTINGS HANDICAP (3&UP F&M) @ 6F | 10 (1) ① | "HORSE 5" (P1) |
| PROTOCOL 2 | MAIDEN $12,500 (WA:3YO) @ 1M | 8 (0) | "HORSE 6" (P3) |
| PROTOCOL 3 | CLAIMING $7500 NW2 OR NW3 (3&UP) @ 6.5F | 8 (1) ① | "HORSE 7" (A1) |
| PROTOCOL 4 | CLAIMING $25,000 (3&UP) @ 1 1/16M | 6 (0) ① | |
| PROTOCOL 5 | OPT. CLAIMING $50,000 (3&UP F&M) @ 5.5F | 5 (0) ② | |
| ALTERNATE 1 | MAIDEN SPECIAL WEIGHT (2YO C&G) @ 5F | 12 (1) | |
| ALTERNATE 2 | MAIDEN SPECIAL WEIGHT (2YO F) @ 5F | 11 (0) | |
| ALTERNATE 3 | CLAIMING $3,500 (3&UP) @ 6F | 10 (0) ① | FIFTY-FOURTH DAY FRIDAY, JULY 23, 2010 |
| ALTERNATE 4 | MAIDEN $7,500 (2YO) @ 4.5F | 9 (0) | |
| ALTERNATE 5 | CLAIMING $10,000 NW@1M (3YO F) @ 1M | 8 (0) ① | FIFTY-SIXTH DAY SUNDAY, JULY 25, 2010 |

THE RACING SECRETARY
*WHERE TECHNOLOGY MEETS TRADITION*

DATABASE | MY ACCOUNT | SIGN OUT

TRAINER'S HOMEPAGE | TENTATIVE ENTRY LIST (TEL) | RACE MENU | YOUR STABLE | STAKES SCHEDULE | MASTER CONTACT LIST | GENERAL INFORMATION

| RANK | RACE DESCRIPTION | # COMMITTED (YOUR STABLE) | DATABASE'S COMMITTED RUNNERS | | | | | |
|---|---|---|---|---|---|---|---|---|
| 1 | MAIDEN SPECIAL WEIGHT (2YO C&G) @ 5F | 12 (1) | "HORSE 7" | | | | | |
| 2 | CLAIMING $3,500 NW3 (3YO F) @ 6.5F | 12 (0) | | | | | | |
| 3 | MAIDEN SPECIAL WEIGHT (2YO F) @ 5F | 11 (0) | | | | | | |
| 4 | CLAIMING $25,000 NW2 (3&UP) @ 1 1/16M | 11 (0) | | | | | | |
| 5 | CLAIMING $3,500 (3&UP) @ 6F | 10 (0) ① | | | | | | |
| 6 | ALLOWANCE (3YO) @ 6.5F | 10 (0) | | | | | | |
| 7 | MAIDEN $7,500 (2YO) @ 4.5F | 9 (0) | | | | | | |
| 8 | CLAIMING $7,500 NW3 (3&UP F&M) @ 6F | 9 (0) | PROTOCOL RACES FOR FRIDAY JULY 23 2010 | | | | | |
| 9 | MAIDEN CLAIMING $5,000 (3&UP) @ 6F | 8 (0) | | | | | | |
| 10 | CLAIMING $10,000 NW@1M (3YO F) @ 1M | 8 (0) ① | PROTOCOL RACES FOR SATURDAY JULY 24 2010 | | | | | |
| 11 | MAIDEN CLAIMING $5,000 (3&UP F&M) @ 6F | 7 (0) | | | | | | |
| 12 | ALLOWANCE (3&UP) @ 1M | 7 (0) | PROTOCOL RACES FOR SUNDAY JULY 25 2010 | | | | | |

(#) = NUMBER OF HORSES FROM YOUR STABLE INTERESTED IN THIS RACE

500

RACE MANAGEMENT SYSTEM

CROSS-REFERENCE TO RELATED APPLICATION

This application claims the benefit of U.S. Provisional Patent Application No. 61/785,250, filed Mar. 14, 2013, the disclosure of which is hereby incorporated by reference in its entirety.

BACKGROUND

The current entry process for thoroughbred racing revolves around the condition book, which lists a set of projected races for each race day in the track's season-long program. Each condition book publishes approximately two to four weeks of races broken down into race days. For example, a race office may publish each condition book with three weeks of races, which includes nine racing days (three a week). So, if there are 25 racing weeks in a season, then the race office would publish between eight and 10 condition books during the race meeting. The condition book is usually published two to four weeks before the first race day's entry date. Each race day includes a set of races designated by the race office with some input from trainers before the book is published. The set of races usually includes 10 races with approximately five races called sub-races, which take the place of races in the first set if any of those races do not fill. For a race to fill, it must have a minimum number of entries (e.g., 5 entries). The race office decides before entry day how many races they would like to have on a race card, and usually the races with the highest field size make the race card with exceptions for stakes races and a few other situations.

The condition book gets its name from the specified set of conditions to balance the competition in a race program. The conditions include a horse's age, sex, and race records. For example, a maiden race is for horses that have never won a race. Once a horse wins a race ("breaks its maiden") it can never run in a maiden race again. The races are then filtered further by claiming price and race distance. Typically, the higher the claiming price, the better the horses, and vice versa.

Entry day is usually three to seven days before race day. This allows racetracks to send out their lists of entries with post positions and jockeys ("overnights") to a horse racing database service (e.g., Equibase, provided by Equibase Company LLC). The database service can then disseminate the information to handicappers, newspapers, etc. The race office sets a predetermined time for when entries open and close (e.g., 9 a.m. and noon, respectively), after which they will draw the post positions. A race track may then post the list of races from the condition book (e.g., on display screen). As trainers enter their horses for a specific race, the race office updates the screen by displaying the current field size and race status on the screen. After a period of time, before entries close, the race office will begin to declare races as "in" or "out" based on their projected field size. This gives trainers an opportunity to find another race before entries close if their original race does not fill.

Many entry days include multiple race days. For example, a Wednesday entry day may include entries for Saturday races and Sunday races. Other entry days may include only one race day. For example, horses may be entered for Friday's races on the previous Friday.

This entry process is common to many race tracks, but it suffers from many drawbacks that have not yet been solved.

One major problem of the current entry process is that the condition book can no longer fulfill its role as an adequate tool for both the race office and trainers, which has a negative trickle-down effect on owners, jockeys, and the rest of the horseracing industry. This problem is caused by the failure of the racing industry to adapt to conditions within the industry, including an insufficient racehorse population.

The lack of confidence in the condition book has resulted in drastic consequences for every type of horseman. Owners have a much harder time supporting the day rates of their horses when they cannot get their horses in races.

Pointing horses for specific races and having any confidence in the condition book's race projections have declined with the horse population. Trainers no longer know when races will fill, so they have to keep their horses ready at all times. This prevents trainers from conditioning their horses up to optimum performance and can make rigorous training frivolous, which leads to less starts during the span of the season.

Most of all, the process hurts the racetrack. When owners cannot afford to stay in the game, fewer horses are available to run, and the race office has to settle with smaller field sizes just to make races go. The smaller the field size, the less betting interests for the public to wager on. In many situations the field size is so small it literally eliminates exotic wagering possibilities (such as superfectas, in which the bettor attempts to predict which horses will finish first, second, third, and fourth in a particular race) that would have brought in thousands of dollars to the total race revenue (or "handle"). The cycle then affects the horsemen again because the next season's purses are built by the money earned in the previous year's handle.

It is estimated that 40% or less of a typical condition book's races, including sub-races, actually make their designated race day. The remaining races are built throughout the race week, which is done by trainers who go into the race office and request a race be written in for their horses. The trainer usually has to prove that at least one or two other trainers are willing to enter their horse in that race so that the race office does not write dozens of extra races filled by only one horse. When a race does not fill, trainers and owners are left scrambling trying to find a race for their horse before entries close. The condition book gives an educated guess of what races might be run that day, but never with any certainty.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A race management system is described herein. In one aspect, a race is chosen and an interested/committed selection is made. If "interested" is selected, the race management system prioritizes races, updates and displays a race menu, and updates and displays an interested/committed list. A TEL (Tentative Entry List) database can notify trainers when they have horses that are interested in a race that has made the TEL. Updates are sent to and/or received from the TEL database. If "committed" is selected, the race management system executes similar steps as if "interested" was selected. In another aspect, a one-day TEL template is uploaded, protocol races are inserted into the template, and prioritized races are transferred from the TEL database to the template. Based on this prioritization, the one-day TEL is constructed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a depiction of an illustrative horse profile page;

FIG. 3 is a depiction of an illustrative one-day TEL page;

FIG. 5 is a depiction of an illustrative TEL database information page;

DETAILED DESCRIPTION

The detailed description set forth below in connection with the appended drawings is an illustrative and nonlimiting description of various embodiments of the disclosed subject matter. The following description proceeds with reference to examples of computer systems and methods suitable for use in horse racing. Although illustrative embodiments of the present disclosure will be described hereinafter with reference to horse racing, it will be appreciated that aspects of the present disclosure have wide application, and therefore, may be suitable for use with many other types of racing, such as greyhound racing.

The traditional process for setting races at a race track can be roughly described has having three steps: (1) the race office publishes a condition book; (2) trainers examine the condition book, pairing their horses with the appropriate races; and (3) the race office and trainers meet to enter horses and fill the designated race card. According to various embodiments of the present disclosure, a race management system provides a fundamentally different race entry process with a much more proactive approach. Conceptually, the steps of the race entry process according to various embodiments described herein can be described as: (1) trainers tentatively enter their horses to races by using the race management system's interactive race menu; (2) the program administrator builds a condition book, called a one-day Tentative Entry List (TEL), using the data from a TEL database; and (3) trainers with horses that have made the one-day TEL confirm their tentative entry, which results in an actual entry. The race management system prioritizes trainer entries (e.g., by field size) in the TEL database. In one embodiment, the races with the highest field size make the TEL.

According to various embodiments of the present disclosure, several benefits are provided to the racing industry. For example, with more certainty that a particular race will run, more entries are encouraged, providing opportunities for owners, trainers, and jockeys to compete, and opportunities for tracks to improve their handle. As another example, with more certainty that a particular race will run, trainers are better able to point a horse for a specific race, which allows trainers to have their horses peak at exactly the right time.

Before explaining the race management system's functionality further, it is important to understand the dynamics of the race management system and how users interact with the program and with each other.

Figure 1:
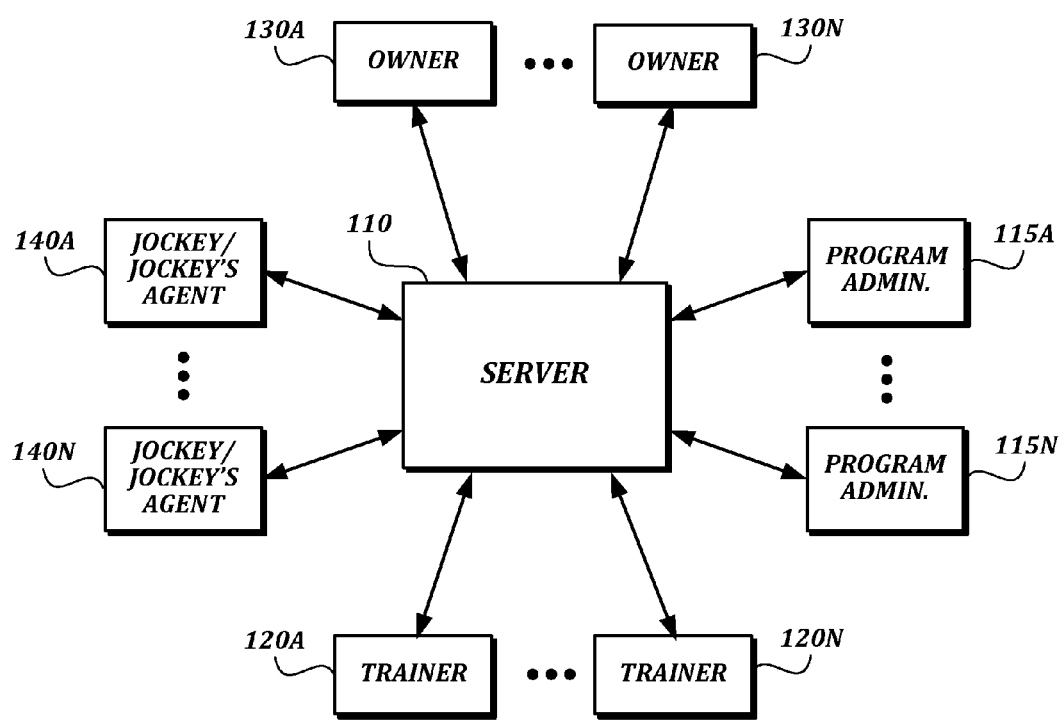
FIG. 1 is a system diagram of a system including a server that runs software that implements functionality of a race management system.

Referring to FIG. 1, a race management system comprises a server 110 that runs software that implements functionality of the race management system. The server 110 may be in communication with one or more other devices via a network. For example, the server 110 may be in communication with one or more program administrator devices 115A-N, one or more trainer devices 120A-120N, one or more owner devices 130A-130N, and/or one or more jockey/jockey's agent devices 140A-140N. As explained in further detail below, devices in communication with the server 110 may perform operations using applications downloaded from or running on the server 110. Functionality can be accessed by such devices via a Web browser or via a stand-alone application. The server 110 or some other computing device also stores, receives, and processes data (e.g., in one or more databases) relating to the race management system. Illustrative computing devices that may be used in accordance with the present disclosure are described below with reference to FIG. 8.

Many alternatives to the system shown in FIG. 1 are possible. Elements of the race management system shown in FIG. 1 can be omitted or replaced with different elements in accordance with the present disclosure. For example, in a racing scenario in which jockeys are not involved (e.g., dog racing), the devices 140A-140N may be omitted.

DETAILED EXAMPLE

The following detailed example describes various aspects of an embodiment of the present disclosure. It should be understood that the specific details of this example (e.g., content, structure, and functionality of user interfaces; content, structure, and functionality of databases; algorithmic details, and the like) may vary from the details described in this section in accordance with the principles of the present disclosure.

In at least one embodiment, the database is hosted on an online server that allows its users to access it from any computer at any time as long as that user provides his or her login information. The server can be updated with changes made by any user in real time. Any device—laptop computer, tablet computer, smartphone, etc.—that has networking capabilities can be used to access the race management system. The racetrack will have its own set of computers available to use the program, but client applications can also be downloaded onto a personal device so that the user can access the software from a remote location. To download the application, a user can provide his or her login information.

The race management system's four main users are program administrators, trainers, owners, and agents. Each user will need to register with the race management system before accessing the software. Each type of user will have a different interface and each user within its type will have its interface customized with his/her relevant information.

The program administrators would be anyone in the track's race office, most importantly the Director of Racing. Responsible for managing the entry process, the Director of Racing usually has between one to five assistants to support the race office's day-to-day responsibilities. A program administrator's user interface would allow him or her to access every account in the software program and manage those accounts accordingly. As soon as a user has registered to the race management system, he or she will have relevant information uploaded to their account. For trainers, it will be their stable of horses. For owners, it will be their string of horses. For agents, it will be their jockey roster. This data will be entered by the program administrator beforehand and updated by the program administrator as needed.

Trainers play the greatest role in the entry process, considering that they usually decide which horses will run in certain races and usually complete the actual task of entering a horse. Further details about trainers and how they will use the race management system are provided below.

As for owners and agents, their roles typically come into play as a result of a trainer's actions. Trainers often have several different owners for several different horses, so an owner's interface will only display information on their horses. Unless a trainer gives an owner entering privileges, the owner's interface will provide read-only access. This allows owners an opportunity to view the race menu, to see what races are projected to make the TEL, and to see whether and where their horse landed on the TEL.

Trainers can also give agents entering privileges but only if the trainer has committed to using the agent's jockey to ride that horse. In most cases the agent's role will be simply to confirm that their jockey has committed to ride a particular horse. This happens after the trainer has entered him or her with a jockey choice included. In this example, agents and trainers are still expected to implement the traditional form of securing mounts by making verbal commitments on the phone or in person. Agents are allowed to confirm the mount and in case of miscommunication or a commitment change, agents and trainers are allowed to find other options.

Figure 6:
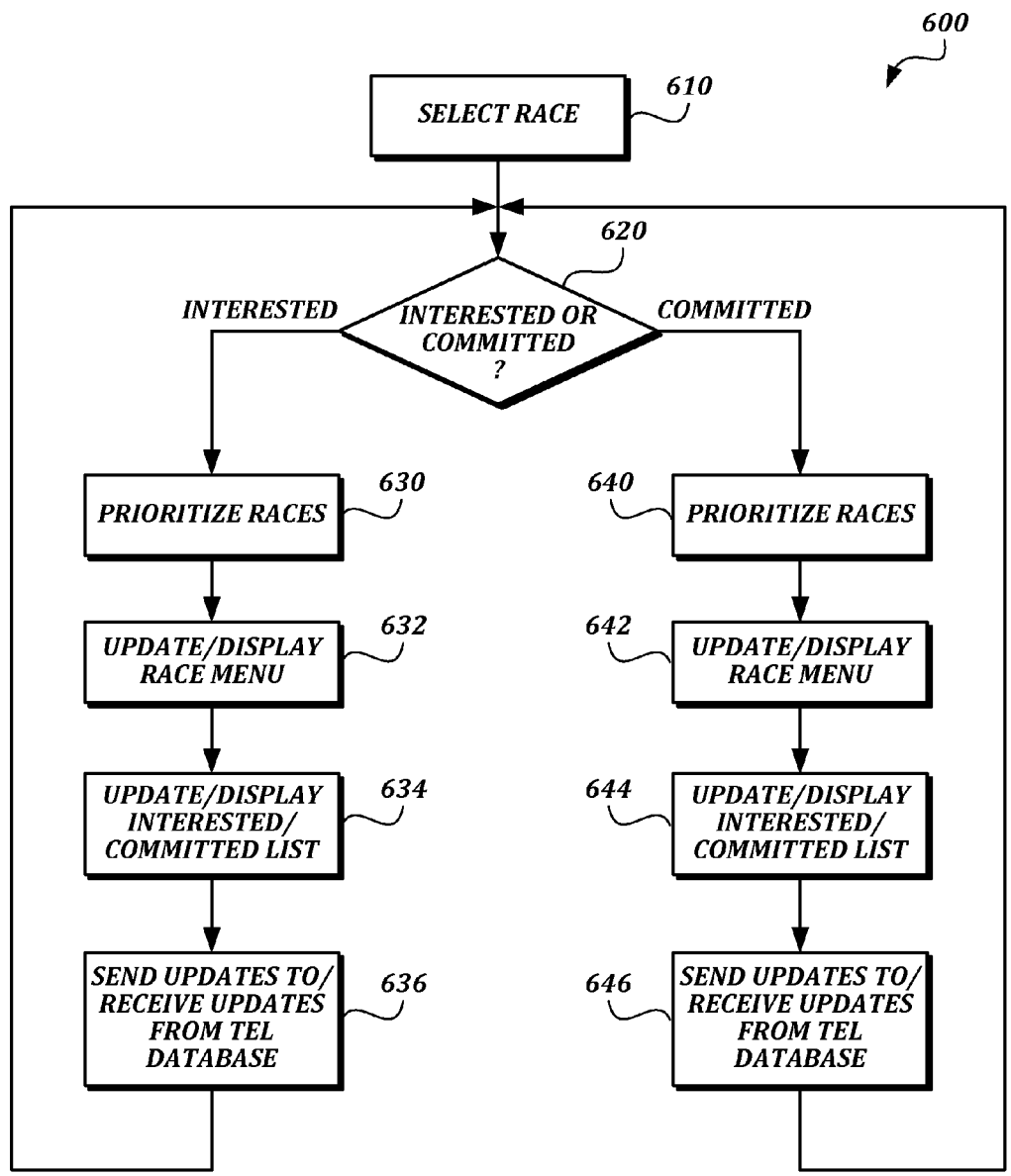
FIGS. 6 and 7 are flow charts that illustrate example processes of recording information with the race menu, compiling and prioritizing data in the TEL database, and using the TEL database to construct a one-day TEL.
Figure 7:
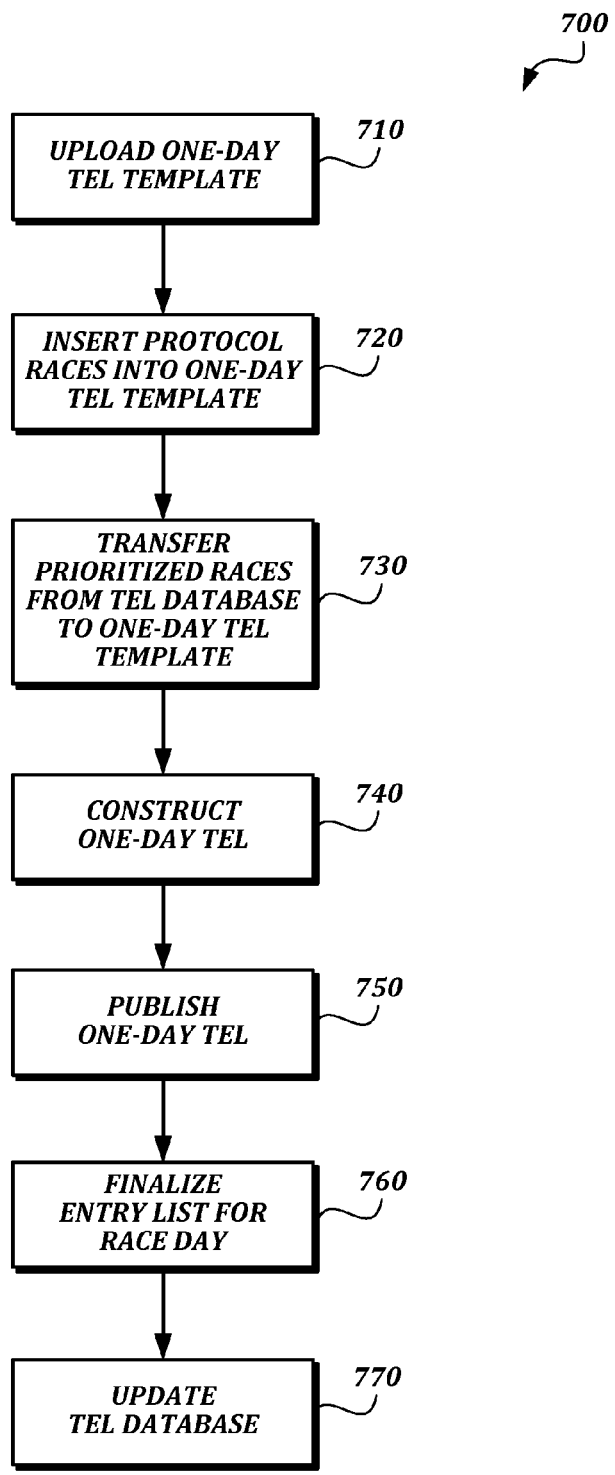

FIGS. 6 and 7 are flow charts that illustrate example processes of recording information with the race menu, compiling and prioritizing data in the TEL database, and using the TEL database to construct a one-day TEL (in place of a traditional condition book). For ease of discussion, some of the steps shown in FIG. 6 are described as being performed by a trainer (e.g., via a trainer's computing device). Alternatively, other users or devices may perform these steps.

Race Menu:

The race menu allows the software to compile the sum of the trainers' entries for each race. The trainer has two options when choosing a race for a horse: interested or committed. As shown in FIG. 6, a race is chosen at step 610 and the interested/committed selection is made at decision block 620. If "interested" is selected, the race management system prioritizes races at step 630, updates and displays a race menu at step 632, and updates and displays an interested/committed list at 634. The TEL database can notify trainers when they have horses that are interested in a race that has made the TEL. Therefore, at step 636, updates are sent to and/or received from the TEL database.

Figure 4:
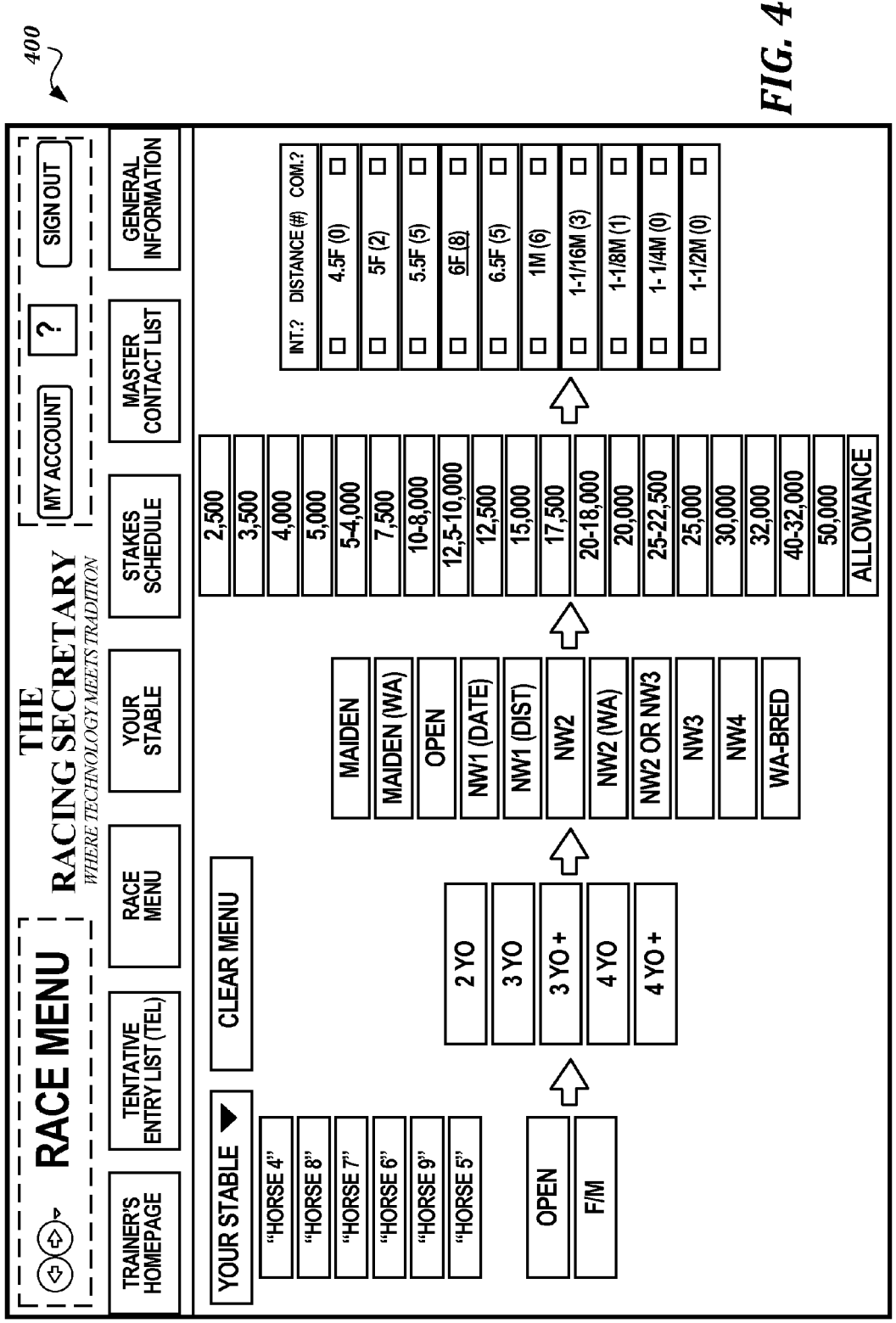
FIG. 4 is a depiction of an illustrative race menu page.

In this detailed example, if a trainer selects "interested," the race management system records the data and displays the new data on the race menu, and that horse's Interested/Committed list is located on the horse's profile page. FIG. 2 depicts an illustrative horse profile page 200, and FIG. 4 depicts an illustrative race menu page 400. The race management system updates each horse's Interested/Committed list as the trainer makes changes to that horse's race preferences. The software prioritizes each race the horse is interested in by field size. Alternatively, the race management system can prioritize races based on other factors, such as race type (e.g., whether a race is a stakes race). The race management system also can provide additional details that indicate results of attempts to enter a race. For example, the software can display a gold star next to each race on the horse's Interested/Committed list if that race has made the one-day TEL.

Referring again to FIG. 6, if "committed" is selected, the race management system executes similar steps as if the trainer selected "interested." In particular, the race management system prioritizes races at step 640, updates and displays a race menu at step 642, and updates and displays an interested/committed list at step 644. By clicking committed, the trainer is tentatively entering his or her horse. Therefore, at step 446, updates are sent to and/or received from the TEL database.

As shown in FIG. 6, it is possible to update a previous selection of an "interested" or "committed" state for a race after the race has been selected and an initial choice of "interested" or "committed" has been made. When the state changes, race menus, interested/committed lists, and the TEL database can be updated accordingly. For example, a trainer that decides to select "interested" for a particular race may also select "committed" in a later step. Similarly, a trainer that decides to select "committed" may decide in a later step to de-commit to a race and instead select "interested." Alternatively, a trainer may elect to not be interested or committed to a race after initially selecting "interested" or "committed." When the trainer is finished making changes, the trainer can select a new race or perform other tasks.

TEL Database:

As shown in FIG. 6, the race management system sends updates to and receives updates from the TEL database at steps 636 (if interested) and 646 (if committed). The race management system updates the TEL database in real time; therefore, the race's field size number and priority is kept up-to-date in the database. The TEL database also notifies the trainer which races the trainer has interested or committed horses in. FIG. 5 depicts an illustrative TEL database information page that shows a list of races with a number of committed runners and also shows committed and interested runners from the trainer's stable.

One-Day TEL (Condition Book):

As shown in FIG. 7, a one-day TEL template is uploaded at step 710, protocol races are inserted into the template at step 720, and prioritized races are transferred from the TEL database to the template at step 730. Based on this prioritization, the one-day TEL is constructed at step 740. At step 750, the one-day TEL is published, and at step 760 the entry list is finalized for race day. At step 770, the TEL database is updated.

FIG. 3 shows an example one-day TEL page 300. In this detailed example, once the program administrator decides to construct the one-day TEL, the races with the largest field size are pulled from the TEL database (shown at the top). Those races will be placed into a one-day TEL, representing the projected races for that particular day. The one-day TEL page 300 shows a list of races with a number of committed runners and also shows committed and interested runners from the trainer's stable. Once constructed, the one-day TEL will be published. The program will then update the TEL database, reflecting all the races not on the current one-day TEL.

More of details of the race management system's functions and the ways in which the race management system can be used are provided below.

Login and Registration:

Once trainers receive their license for the season, the Program Administrator (PA)—the track's Director of Racing and/or an appointed race official—will give each trainer a personal username. The username will include the first initial of the trainer's first name followed by the trainer's last name in lowercase letters (e.g., John Smith becomes jsmith).

The first step for trainers, referred to in this section as "users," is to open the software program, where they will be prompted with a "Login Page." On that "Login Page," new users can see a link that reads "New User? Register Here." By clicking "Register Here," the program directs new users to a "Registration Page." On the "Registration Page," the new user is required to answer the following items: the user's first and last name, phone number, racetrack occupation (i.e., trainer, owner, agent, etc.), a login password, and password confirmation. If a new user has both a trainer's and owner's license, that user will choose trainer under racetrack occupation. New users will also need to confirm their password on the "Registration Page" by retyping their chosen password a second time to make sure the password was entered correctly. If the password and confirmed password match, then no further actions are needed. If the password and confirmed password do not match, the program will ask the user to retype the password and confirmed password until they match. A username and password will be required each time a user logs in to the race management system. The new user's e-mail address is the only optional item on the "Registration Page." Some users either do not have an e-mail address or do not use e-mail effectively. While entering an e-mail address is optional, the race management system strongly encourages having an e-mail address to maximize the benefits of the software program. If users do not have an e-mail address during the registration period, they can add one anytime during the season by accessing the "My Account" button, located in the top-right corner of the pages shown in FIGS. 2-5. The same goes for users that want to change their e-mail address later in the season. After the necessary items have been completed on the "Registration Page," the user will click "Register" to complete the registration process. After registration, the only time trainers will need to type during use of the race management system is during the log-in process, otherwise the computer mouse or touchscreen will suffice.

Once registered, trainers can log into the race management system anytime from a race office computer or from any remote location (a remote location can be a personal computer, smart phone, tablet, etc.). To access the race management system from a remote location, trainers must download the application from the race management system Web site by logging in with their registered username and password (directions on how to download the application are explained on the Web site). If trainers forget their password, they can request the password via e-mail, if they provided one on the "Registration Page." Trainers that do not have an e-mail address and want to change their password must contact the PA to make those changes. Also, the race management system does not allow a trainer to save their password on public devices. However, the race management system does allow trainers to save their password on remote devices. It is the trainers' responsibility to make sure those login locations are secure. Furthermore, the race management system allows five attempts to enter a correct password on the "Login Page." This prevents unauthorized users from trying to decipher a trainer's password. If more than five incorrect attempts occur, the race management system freezes that trainer's profile, and the trainer must contact the PA to have it restored (explained further in the PA's manual). The purpose of this added security is to eliminate opportunities for unauthorized individuals to access a trainer's confidential information. Once trainers register, they will have full access to their own personal racing secretary each time they log in through the "Login Page." The "Login Page" will appear each time the user starts up the software. Now trainers can begin to use the software and organize their stable accordingly. When trainers submit their horses' papers to the race office, the PA enters the necessary data—the horse's age, sex, career statistics, etc.—into the race management system database. Trainers should have all the necessary data to operate the race management system starting from the first time they log in. The PA can also add, subtract and/or modify the necessary data as horses enter and leave the ground throughout the season.

When trainers finish a session and are ready to exit the race management system, they need to click "Sign Out." The "Sign Out" link is located in the top-right corner of the pages a trainer has access to (see, e.g., FIGS. 2-5) in the race management system. Once a trainer has clicked "Log Off," the race management system returns to the original "Login Page." When using a personal device, a trainer's profile remains open for only 15 minutes of idle time before logging off automatically. In the race office the allowable idle time is two minutes. The purpose of this feature is to prevent other individuals from accessing confidential information if a trainer forgets to log off.

Once registered, trainers only have access to information in their personal profile. The only other individual that has access to a trainer's profile is the PA, who has access to every profile in the race management system.

The "Trainer's Homepage" is the first page to appear after a trainer has logged in, and the first button shown in the program's menu bar. The menu bar is located near the top of the page and is a navigational tool for trainers to use when traversing through the race management system.

The "Tentative Entry List" is the second button shown in the program's menu bar, and when clicked, a drop-down menu appears displaying four items. The first item is the Tentative Entry List (TEL) Database (see FIG. 5). Assuming the track season has three-day race weeks, the TEL drop-down menu would display three additional items, a one-day TEL for each day.

The TEL database is assembled by the sum of each trainer's entries, in real time, rather than a printed condition book that assembles races and waits for trainers' entries. The TEL database is an instrumental component of the race management system and effectively replaces the reactive condition book with a proactive software program. The TEL Database compiles every race available in a track's racing program and prioritizes those races based on factors such as field size. The TEL Database functions like sports standings: each race is essentially competing to make its way to the top with the goal of making a one-day TEL. Only a certain number of races from the TEL Database will make a one-day TEL. That number will be determined each week by the race office. It is also important to remember that the TEL Database is fluid and can be updated at any time, in real time. As trainers disseminate their horses into different races, the races' field sizes change, and therefore the ranking order inside the TEL Database will change. This process continues until a one-day TEL is published. Next to the TEL Database is a table titled "Database's Committed Runners." The software constantly updates this table as trainers commit their horses to a particular race. The software only displays runners on this list if the race makes the cutoff number determined by the race office. The table displays the runner's name with a number in parentheses, indicating where that race currently ranks in the TEL Database. Below the "Database's Committed Runners" table are three links that will direct a trainer to the current list of protocol races for that day (protocol races are explained further below; the TEL Database is assembled by alternate races only).

One-Day TEL:

For each racing week, the race office will set a predetermined time when the TEL Database of alternate races is combined with protocol races to form a one-day TEL. When the race office publishes the one-day TEL, it becomes, in effect, a condition book. Trainers that did not commit a horse to a race on the one-day TEL will still have plenty of time to do so. The reason for publishing the one-day TEL before the entry day is to (a) prevent alternate races from interchanging above or below the cutoff line, (b) to allow trainers enough time to condition their horses to peak performance for the scheduled race day and (c) give agents enough time to secure a mount. The race office has less concern about races filling for that race day because the one-day TEL has now created a condition book of races based on projected field size.

The top of each one-day TEL includes which day and date the listed races will run, the day of the meet (e.g., 54$^{th}$ day of an 81-day meet) and the day and date when entries close. Each one-day TEL contains three columns. The first column defines the race type based on whether the race office or trainers initiated the race. The two options are protocol races, appointed by the race office, and alternate races, assembled by the trainers.

Protocol races are races that the race office has designated as must-run races, under the requirement that the protocol race can obtain a five-horse entry minimum. Protocol races are considered essential to a racing program, regardless of maximizing entry numbers. Protocol races may include, but are not limited to, stakes races, claiming challenges, sparsely run races (to give all horses an opportunity to run), 2-year-old races, etc. Throughout the season, the race office can assign as many protocol races as it sees fit. Protocol races occupy the top rows in each one-day TEL and are sorted by field size, with the largest field size starting at the top.

After protocol races, the rest of the one-day TEL is filled with alternate races. Alternate races are a key ingredient to the program's TEL and to the race management system and are made up of the highest-ranked races in the TEL Database. Since protocol races are appointed by the race office and only need the five-horse entry minimum, they generally do not have as great of an impact on field size as alternate races. Alternate races qualify for each one-day TEL by their field sizes, so only alternate races with the largest field size make the TEL. If there are six alternate race slots available, then the six alternate races with the largest field size make the one-day TEL. The one exception would be if the PA decided to "share the wealth" with other one-day TELs in the same racing week by transplanting alternate races with larger field sizes to days projected to have higher attendance, wagering participation, etc.

To help trainers differentiate between protocol races and alternate races, the race management system provides a color-coding scheme to the race slot's background. For example, protocol races are in red and alternate races are in green.

Following a 10-race TEL example, imagine there are five protocol races and five alternate races. Since protocol races and the alternate races do not mix inside a TEL, in this example, protocol races are in the top five slots and alternate races are in the bottom five slots.

For example, the protocol race with the largest field size will be listed as P1 in the TEL's first column. Meanwhile, the alternate race with the largest field size will be listed as A1, despite the fact that it sits in the TEL's sixth slot (the importance of numerical identification is explained further in the "Today's Committed Runners" section below). Essentially, the makeup of a one-day TEL includes the race office's highest-priority races using protocol races, while alternate races positively impact field size and give trainers some control over what races to run.

Race Description:

The TEL's second column is the race description, which includes race type, race conditions, horse's age and sex, and race distance (e.g., "Claiming $7,500 NW2, 3&UP F/M @ 6.5F"). The race description text is also a link to a "Detailed Race Description" page, which includes more details about the race.

The "Detailed Race Description" page displays race details similar to what a trainer would see in a traditional condition book. Details may include the following:

Race Type (stakes, allowance, claiming, etc.);
Total Purse (some may include a purse breakdown according to the official order of finish);
Conditions (maiden, non-winners of two, state-bred, etc.);
Claiming Price (if applicable);
Weight Allowances;
Distance; and
Disclaimers (e.g., track reserves the right to retain possession of registration papers for any horses claimed at the track until the conclusion of the race meet).

"Committed" Versus "Interested": Before explaining the TEL Database (see FIG. 5) and the One-Day TEL (see FIG. 3) further, it is important to understand the difference between "committed" and "interested." The two terms define each horse's relationship to a race throughout its trainer's search process. However, the difference between both terms in the race management system is significant. When trainers select races that their horses are interested in, they indicate a certain level of curiosity in those races. When trainers select a race to be committed to, they indicate they have made a tentative decision to run their horse in that race. During trainers' race search process, the race management system allows trainers to select a (theoretically) unlimited number of races for their horse to be interested in. (In practice, the number of races may be limited by storage and/or processing power limitations, the number of races that are available, or other factors.) This allows trainers to keep track of several races for a single horse, without having to commit to a particular race (explained further in the "Race Menu" section). Trainers should keep track of more than one race for a single horse, so they have options available if their top race choice will not make a one-day TEL. It is important to remember that the number of horses interested in a race does not count toward the final number of committed entries and therefore has no effect on the TEL Database. While there is no limit on the number of races a single horse can be interested in, each horse can only be committed to one race at a time. When trainers commit a horse to a race, they tentatively agree to run their horse in that race. Using the interested and committed tools will maximize trainers' ability to find and fill the best race for their horses.

The TEL Database and the one-day TEL's third column (see FIGS. 3 and 5) display separate numbers, which indicate the number of entries for each race. The first number, not in parentheses, represents the track's total number of committed entries for that race. The second number, in parentheses, represents the total number of committed entries from the trainer viewing the TEL. The first number's total controls whether or not a protocol race makes the TEL (must have five entries minimum) and also controls where an alternate race ranks in the TEL Database, if at all (the higher the number, the greater the field size). Trainers should follow these numbers as they use the race management system to get a better understanding of which races are likely to make a one-day TEL when the one-day TEL is published. Also, if a trainer has at least one committed runner in a race, that number is also included in the total number of entries.

For example, if the number of entries column displays 10 (2) for a particular race, that means the total number of entries is still 10. A trainer would not add two to make 12. The race management system includes the number of committed runners from a trainer's stable in the total number of committed runners.

A third possible number could appear in the third column of the TEL Database and/or one-day TEL. This number can be presented as a button that indicates how many horses a trainer has interested, but not committed to a race. The purpose of this button is to give trainers an opportunity to commit to a race that is already on or likely to make a one-day TEL. The button only appears if the trainer has a horse or horses interested in the race.

By clicking the button, a new window opens, giving trainers a list of their horses (in alphabetical order), not on the current one-day TEL, that are interested in that race with two checkboxes—one for interested and one for committed—next to each horse's name. When the list appears, trainers can then decide their next move. Interested runners have the first checkbox marked, indicating they are interested, while the second checkbox is unmarked, indicating they have not yet committed. With interested runners, trainers have the option to select the second checkbox to commit the horse to that race, deselect the interest box to stop following the race, or do nothing (which would keep the horse interested in the race but not committed to it). Once trainers complete their desired actions on this list, they will click done, which closes the window and returns them to the last TEL page they were on. Also, if any of these horses that they have just committed were previously committed to another race, the software opens a window to ask trainers if they would like the new commitment to replace the existing one (yes or no). After clicking the desired answer, trainers will return to the previous TEL page.

Staying on the "One-Day TEL" page (see FIG. 3), trainers will see a one-column table on the TEL's right side, titled "Today's Committed Runners." This tool provides a list of the trainer's horses (e.g., in alphabetical order) that are committed to a race on that day's TEL. The purpose of the "Today's Committed Runners" list is to give trainers a clear diagram of their stable's participation for that day. As the one-day TEL gets closer to its entry date, trainers can view the "Today's Committed Runners" list to see which of their horses are likely to run that day. The race management system helps trainers stay organized further by displaying numerical location points next to each race on the TEL that their horses are committed to. If a trainer's committed runner makes the one-day TEL, the horse's name is displayed on the "Today's Committed Runners" list with an initial and number, in parentheses, next to its name. The initial indicates the type of race (e.g., "P" for protocol races and "A" for alternate race). The number indicates the race's slot on the TEL.

For example, as shown in FIG. 3, "Horse 5 (P1)" means Horse 5 has committed to the first protocol race on that day's TEL. "Horse 7 (A1)" means Horse 7 has committed to the first alternate race on that day's TEL. If another alternate race overtakes Horse 7's alternate race for the top slot and Horse 7's race moves into the second slot, then the "Today's Committed Runners" list would reflect that change in real time.

Below the "Today's Committed Runners" list on each "One-Day TEL" page there is a link for each of the other days in that race week (for example, there would be two additional links based on a three-day race week). By clicking either link, the race management system directs a trainer to another "One-Day TEL" page. This function allows trainers the option to travel back and forth between race days in the same week. For example, in a three-day race week, if a trainer had Friday's TEL open, then the other two links would direct the trainer to Saturday's and Sunday's TEL. If a trainer had Saturday's TEL open, then the other two links would direct the trainer to Friday's and Sunday's TEL. Each "One-Day TEL" page follows the same format. The differences in each page result from the different races that compose that day's TEL.

Race Menu

The "Race Menu" page (see FIG. 4) is the third button shown in the program's menu bar and the trainer's most important research tool in the race management system. The race menu may include any race type offered in each track's racing program. The race menu's purpose is to provide trainers with an opportunity to build races for the TEL Database, and to have more control in the process of filling races. The race menu is an interactive tool trainers use to locate the optimum race for their horse and allows trainers to observe the early projections of what races are most likely to make a one-day TEL. The race menu uses a series of tree-structured, drop-down menus designed for smooth and efficient navigation. The drop-down menus work like a step-by-step filtration system, which funnels trainers further through the race menu as the prerequisites necessary to define a race become more specific. The race menu's tree structure allows trainers to navigate back and forth seamlessly through the race menu without losing their place.

Using the Race Menu:

Since each race menu can be made to be unique to each horse, trainers' first step is to decide which horse they want to find a race for. Accordingly, in the example shown in FIG. 4, the first drop-down menu provides a complete list of every horse, in alphabetical order, in the trainer's stable. In the traditional condition book, a trainer might have looked at each race and then had to decipher which horses would fit the conditions. Instead, the race management system provides trainers an easy route by focusing on one horse at a time and allowing them to find the perfect race for their horse. Similar to other functions in the race management system, every change trainers makes in the race menu throughout the season is saved and updated in real time. Furthermore, the race management system knows every race that each individual horse is eligible for and can eliminate every race the horse isn't eligible for. So, when trainers choose a horse to find a race for, they are not inundated with races that do not apply to their horse.

For example, if Horse 9 is a 5-year-old, Kentucky-bred mare with 10 wins, the race management system can eliminate every race Horse 9 is not eligible for without any added support needed from the trainer. So in Horse 9's case, all 2-year-old, 3-year-old and 4-year-old only races would not be displayed, as well as state-bred races (if outside Kentucky) or conditions that disqualify Horse 9 based on her number of wins.

Once a trainer decides which horse to find a race for, the race hunting begins. As trainers decide which category they want in each drop-down menu, they move on to the next drop-down menu until the race has been fully defined.

The second tier drop-down menu lists its race categories based on sex. If the horse is a colt or gelding, then its trainer can only select from open races. If the horse is a filly or mare, then its trainer can select from open races and filly and mare races. As part of its elimination process, the race management system does not display filly and mare races on a male horse's race menu, considering that the male horses are not eligible for female races.

The third tier drop-down menu lists its race categories based on age. The most common race classifications by age include 2-year-olds, 3-year-olds, 3-year-olds and upward, 4-year-olds, and 4-year-olds and upward.

The fourth tier drop-down menu lists its race categories by conditions. Possible race conditions include, but are not limited to, maiden, maiden (state-bred), open claiming, NW1 (date), NW1 (distance), NW2, NW2 (state-bred), NW2 or NW3 (state-bred), NW3, NW4 and state-bred claiming races. As horses race through their conditions, the race management system updates the race menu throughout the season accordingly.

The next drop-down menu lists its race categories by claiming price. Since most racetracks have a set list of claiming prices for each race condition, not every claiming price applies to each race condition.

For example, the race office might run claiming races for a $3,500 tag, but the track's lowest maiden claiming price is $5,000. Since this structure is common at most racetracks, the race management system eliminates all maiden races for $3,500 from the race menu, because that race does not exist in the racing program.

It is the race office's responsibility to determine which claiming prices are permitted for each race condition. Possible claiming prices include, but are not limited to (in $): 2,500, 3,500, 4,000, 5,000, 5-4,000, 7,500, 10-8,000, 12.5-10,000, 12,500, 15,000, 17,500, 20-18,000, 20,000, 25-22,500, 25,000, 30,000, 32,000, 40-32,000, 50,000, and allowance (no claiming price).

The next and final (in this example) drop-down menu lists its race categories by distance. Possible distances include, but are not limited to, 4.5, 5, 5.5, 6, and 6.5 furlongs, and 1, 1 1/16, 1 1/8, 1 1/4, and 1 1/2 miles.

In the distance drop-down menu, unlike the previous drop-down menus, several items will appear in each slot. Within each slot (moving left to right) there is a checkbox for designating interested runners, a distance, a number (which represents interested horses unless either checkbox is checked, in which case it will represent committed horses) and another checkbox for designating committed runners. The purpose of knowing the total number of interested runners before clicking interested in a particular race is because if there are little to no horses interested, then the trainer need not bother keeping tabs on a race that likely will not rank high enough in the TEL Database. Even though keeping tabs on several races for a single horse will benefit a trainer's search process, collecting data on races with seemingly no chance of filling can muddle the trainer's database of useful information.

Once trainers select a race for their horse to be interested in, they click the appropriate checkbox and the number in parentheses changes from the total number of horses interested in the race to the number of horses committed to the race. In order to reach each distance category in the drop-down menu, the trainer has already navigated through the previous drop-down menus. When trainers check the interested box for a specific distance, they are not just expressing interest in the distance, but the entire set of categories that they just navigated through. Also, if a trainer clicks interested or committed from the race menu, that information is stored so that the data can be used elsewhere in the program, including in the TEL Database, a horse's personal profile page (explained further in the "Stable" section below) and e-mail notifications.

When trainers select "interested," they can keep tabs on the race without committing to the race and have the option to commit to the race later when ready. If trainers commit their horse to a race (in this example, a horse can only be committed to one race at a time), the number in parentheses will add one because it now includes the newly-committed runner. Also, if trainers commit a horse by mistake or decide to rescind their horse's commitment, they can simply deselect the commitment checkbox by clicking it. The progressive process of selecting "interested" and then selecting "committed" works the same way backwards, so that when trainers rescind their horse's commitment their horse stays interested unless their trainer deselects "interested" as well. If trainers commit a horse to a race but that horse is already committed to another race, the race management system opens a window asking trainers if they would like the new commitment to replace the existing commitment. After trainers click yes or no, they will return to the race menu.

Stable

The "Your Stable" feature is the third button shown in the program's menu bar and it operates as a drop-down menu listing every horse, in alphabetical order, in a trainer's stable. Typically, any trainer registered to use the race management system will have at least one horse in their stable. Some trainers may have dozens. The "Stable" link lists the trainers' horses' names, which serve as links to each horse's profile page.

Horse Profile Page

Once trainers choose which horse's profile to view, they will click that horse's name and be directed to its profile page (see FIG. 2). Each profile page has the same format—the horse's name and description at the top-center of the page and six separate tables. The horse's description, located in the top center of the page, includes: its name, state and date of birth, color, sex, sire, dam, and dam's sire. Furthermore, if trainers want more detailed information (e.g., career statistics, race results, and/or charts, etc.), they click the horse's name, which links to its profile page on an external site (e.g., equibase.com, provided by Equibase Company LLC).

On the left side of the horse's profile page are three stacked tables, starting from the top with medication, then equipment, and then other equipment. Even though some options listed in each table may vary from state to state, most are uniform across the country. Any changes to these categories before races must be announced by entry time, similar to the traditional process of declaring medication and/or equipment changes. The trainer can also make changes multiple times between races, but at entry time all changes will be final. The trainer makes changes by clicking a checkbox or otherwise selecting the appropriate category. If selected, the trainer has declared intent to use that specific medication or equipment. The trainer can also deselect a medication or equipment (e.g., by clicking a checked box). The race office will be notified through the race management system of any medication or equipment changes made.

In the medication table, the three options include Bute, First Time Lasix, Lasix On, and Lasix Off. The Bute option has a checkbox on its right where a trainer can select whether or not to use the listed medication. The First-Time Lasix, Lasix On, and Lasix Off categories are controlled by radio buttons as each item is mutually exclusive. The First-Time Lasix button only appears if the horse is a first-time starter or has yet to use Lasix in any of its previous races. Once a horse has used Lasix, only Bute and Lasix will remain in the medication section. While most trainers keep each horse's medication (only regarding Bute and Lasix) plan the same throughout its career, they can make any changes through the race management system between races.

In the equipment table, the three options include Blinkers On, Blinkers Off, and No Blinkers. Similar to the medication table, each option has a radio button on its right-hand side, where a trainer can select whether or not to use the listed equipment. The First-Time Gelding item only appears if the horse is a colt. Once the horse has raced as a gelding, the option will disappear. Blinkers On requires more steps than the other details because a change to Blinkers On requires approval by the stewards before the horse's next race. If the horse raced with blinkers in its previous race then stewards' approval is not necessary. Once Blinkers On has been approved, the PA updates the change through the race management system. If the change has been updated, the trainer only needs to click Blinkers On and no other actions will be needed. However, if the change hasn't been approved by the stewards, or for whatever reason the race management system hasn't been updated, the trainer is prompted with a "Not Approved" message. It is the trainer's responsibility to correct the change with either the stewards or the PA or forfeit the change. The second option is Blinkers Off, which is not technically the same as a horse not wearing blinkers. Blinkers Off in the program indicates that the horse wore blinkers in its previous race. Many handicappers use Blinkers On and Blinkers Off as a tool to decipher a horse's chances of winning. If trainers choose to take the blinkers off, they can select Blinkers Off. If the horse never wears blinkers or did not wear blinkers in its previous race, then No Blinkers can be selected. Also, after a horse has raced with the blinkers off for the first time after having worn blinkers, the program's logic can update the changes by deselecting Blinkers Off. As for First-Time Geldings, it is important that the horse's trainer declare this change in the race management system as soon as the horse has been gelded. Many racetracks enforce penalties for trainers that race a first-time gelding without informing the public.

The other equipment table is a table with checkboxes for each option. The other equipment table's purpose is to help trainers remember what equipment they might have used for that horse in its previous race. None of the options need to be approved by the stewards or have the changes published in the program. Any of these changes, however, may be recorded by the track's paddock judge or an Equibase official.

Interested and Committed List:

In the center of the horse's profile page (see FIG. 2) is a three-column table that displays races the horse is interested in and/or committed to. Each time a trainer navigates through the race menu (explained in the "Race Menu" section above) and selects interested and/or committed to a race, the information is recorded in the program's database and displayed on the horse's personal profile page in real time. This allows trainers to see exactly what race decisions they have already made for the horse and the status of those races. On the profile page, the Interested/Committed List (ICL) can display a maximum of 10 different races. If a horse is interested in more than 10 races, a link below—"More Races"—will take the trainer to a new page displaying races the horse is interested in or committed to. In the example shown in FIG. 2, only one race has been committed to.

The first column is the race description, which displays the same information, in the same format that is provided by the TEL (explained in the "Race Description" section above). Clicking the race description link in an ICL takes trainers to the same page if they were clicking the link in a TEL. The race description link directs trainers to a new page with a more detailed description of the race (explained in the "Detailed Race Description" section above), similar to what they would see in a traditional condition book.

The second column indicates the number of horses committed to that particular race. The number in this column updates in real time and is the exact same figure that a trainer would see in parentheses (explained in "The Final Step in Selecting a Race" section above) in the race menu once that horse is interested in the race. If the horse is committed to a race, then that number includes the horse. If the horse is only interested in that race, then the number only represents the other horses committed to the race.

The third column contains two checkboxes—one for interested and one for committed—for each race. The purpose of these checkboxes is to help a trainer manage each race within the ICL. While this functionality may also be provided on other pages (e.g., a race menu page), instead of having trainers return to the race menu to commit a horse or to deselect a race the horse is interested in or committed to, the trainer can make the necessary changes in the horse's ICL (the trainer has the option to make changes in the race menu). The checkboxes function similarly to the ones explained in the race menu.

For example, as shown in FIG. 2, Horse 4 has four races on the ICL—one "committed" race and three "interested" races. The ICL's top line indicates she is committed to a race, which has the committed box checked. The next three lines of the ICL display her interested races, which have the interested box checked but the committed box unchecked.

Example Scenario 1: Horse 4 needs one more week of fitness training, so she cannot make the race that she has committed to. Horse 4's trainer then deselects the committed checkbox on that top line. As a result, Horse 4 becomes only interested in (not committed to) that race. Without the checkboxes, the trainer would have to navigate through the race menu to find the specific race and then rescind the commitment.

Example Scenario 2: Horse 4 is ready the next week, but has yet to commit to one of the races that she is interested in. Her trainer chooses to commit Horse 4 to the race on the top line because it has the largest field size, and therefore the greatest chance of making or staying on the TEL. The trainer clicks the "committed" checkbox to commit Horse 4 to that race. This scenario may apply to any situation in which a trainer has a list of interested races for a horse without a commitment. Once again, when trainers decide to make the commitment, they will not have to navigate through the race menu to commit to a race.

The ICL also has some additional features including a color-coding scheme to show which races on the ICL are either protocol races or alternate races, and a star (which may also have a distinctive color) which indicates that a race is currently on a one-day TEL. In an example race menu color-coding scheme, a red background color represents a protocol race and a green background color represents an alternate race. A yellow star will be displayed next to number of total entries in the second column.

In the top-right corner of the horse's profile page is a one-column table that displays each horse's status in real time. The current status represents whether or not a horse is able to race and if not, why not. The purpose of the current status function is to make sure each trainer upholds the program's integrity. The current status function notifies the race management system and the PA of privileges each horse has and can provide the ability to revoke privileges when rules have been violated. Status changes may be performed by a user or may be automatically made based on known information.

Race Ready:

This is the optimum status for a racehorse because it means as soon as a race is available, the horse can enter. Trainers are expected to check the box next to Race Ready, as soon as they know the horse is ready to race. Also, if a horse has been Race Ready for 21 days without entry, the PA may inquire why the horse not been entered. This helps the PA keep tabs on each stable and verify the race management system has provided each horse an opportunity to enter. If not, an evaluation process should take place. When a horse is Race Ready, the trainer will have no restrictions regarding any actions with the horse. Trainers can select committed or interested for any races this horse is eligible for.

Not Race Ready:

This status could be checked for numerous different reasons including that the horse is ill, sore, injured, unfit, still maturing, etc. When a horse is Not Race Ready, trainers can select races for their horse to be interested in, but cannot commit their horse to any race until the trainer has checked Race Ready.

Resting from Race:

On the day the horse has raced, the PA checks Resting from Race in the current status table and updates any new changes. By checking Resting from Race, the PA initiates a command to update the program's database. This means, for each horse, the previously committed race will be cleared, horse conditions updated, and TELs replaced. If trainers choose to race their horse again within seven days, they can uncheck Resting from Race by selecting Race Ready. If the trainer does not uncheck Resting from Race after seven days, then the PA will check Race Ready for the trainer after seven days are up. When a horse is Resting from Race, trainers can select races for their horse to be interested in, but cannot commit their horse to any race until the trainer or PA has checked Race Ready.

It is possible that a horse may automatically be updated to Resting from Race status based on known information to reduce the administrative burden on a trainer or PA. For example, a horse may be automatically changed to "Resting from Race" after a race in which the horse was committed to compete has been completed.

Vet's List or Steward's List:

This status is checked by the PA when a horse is currently on the Veterinarian's (Vet's) List or Steward's List. These are two separate statuses on the profile page, but the restrictions are the same. Until the PA takes a horse off the Vet's List or Steward's List, pending approval from the track veterinarian or steward, the horse cannot be interested in or committed to any race. Instead of the program clearing out the ICL, forcing the trainer to re-search for the previous races on the list, the program freezes the ICL. Once the PA restores the horse's privileges, the ICL is unfrozen with all the horse's previously interested races updated.

Jockey Selection List:

In the bottom-right corner of the example horse's profile page 200 shown in FIG. 2 is a one-column, drag-and-drop menu called a Jockey Selection List (JSL). The JSL is used to secure jockey mounts for each individual horse on entry day. The JSL displays, in ranking order, a list of jockeys that a trainer would allow to ride their horse. A JSL can have a complete list of every rider from the track's jockey colony. However, the JSL order is unique to each individual horse (e.g., trainers might have a completely different ranking order for two different horses in their stable depending on which jockeys they feel will best fit their horse). A JSL can include each listed jockey's full name with each jockey agent's initials in parentheses. The agent's initials can act as a hyperlink to the agent's contact information (e.g., a phone number). If jockeys represent themselves, the word "self" can appear in the parentheses and act as a hyperlink to the jockey's contact information.

The JSL works similarly to how trainers choose races for their stable of horses. Trainers can choose which jockeys they are interested in to ride their horse. The choices are listed in ranking order, so each horse's first option is their top choice with their second choice following next, etc. On entry day, all jockey's agents need to do is log in to the race management system, where they can see every horse for which their jockey is the top choice. In following the traditional process of booking mounts, the race management system assumes that the trainer and agent have already personally made their respective commitments. If the traditional process's integrity is upheld, then finalizing the commitment on the race management system will be a formality. However, if miscommunication occurs, or if a trainer and/or agent decide to disengage their verbal commitment, the race management system initiates the jockey selection process based on the trainer's pre-selected preference list. Neither trainer nor jockey will be forced to engage in business together, unless the trainer and agent have kept those parties on their JSL. The JSL can be updated anytime, which includes adding, subtracting, or rearranging jockeys on the list.

On entry day, trainers have their horse's No. 1 jockey listed as whom they expect to ride for the upcoming race. It is then the agent's responsibility, two hours before entries close, to "sign off" on the riding commitment using the race management system. If agents verbally commit the same jockey to two or more horses in a single race, they will then need to commit their jockey to the most desired mount. After a jockey commits, the race management system automatically removes that jockey from every horse's JSL, as that jockey is now considered unavailable. All available jockeys on the individual JSLs will cycle upward as other committed riders above them become unavailable. If the trainer's top choice has committed elsewhere, the next available jockey to cycle into the No. 1 slot becomes the trainer's next option for commitment. In cases where more than one trainer has no rider upon entry time, the horse will get the highest ranked available jockey on their list. If both trainers have the same jockey as their current No. 1 option, then the jockey may commit to a trainer based on some other criteria, such as an agent's Trainer Selection List, which may be implemented in a fashion similar to the JSL.

Operating Environment

In any of the examples described herein, computing devices may be any suitable computing devices, including, but not limited to, laptop computers, desktop computers, smart phones, tablet computers, and/or the like. Servers may include suitable computing devices configured to provide services described herein. As used herein in the context of a server-client relationship, the term "server" refers generally to a computing device that provides information (e.g., video and audio data) and/or services to other devices over a communication link (e.g., a network connection), and is not limited to any particular device configuration. Servers may include one or more suitable devices, such as dedicated server computing devices, or virtualized computing instances or application objects executing on a computing device. The term "client" can be used to refer to a computing device that obtains information and/or accesses services provided by a server over a communication link, and is not limited to any particular device configuration. However, the designation of a particular device as a client device does not necessarily imply or require the presence of a server. At various times, a single device may act as a server, a client, a server and a client, or neither, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 8:
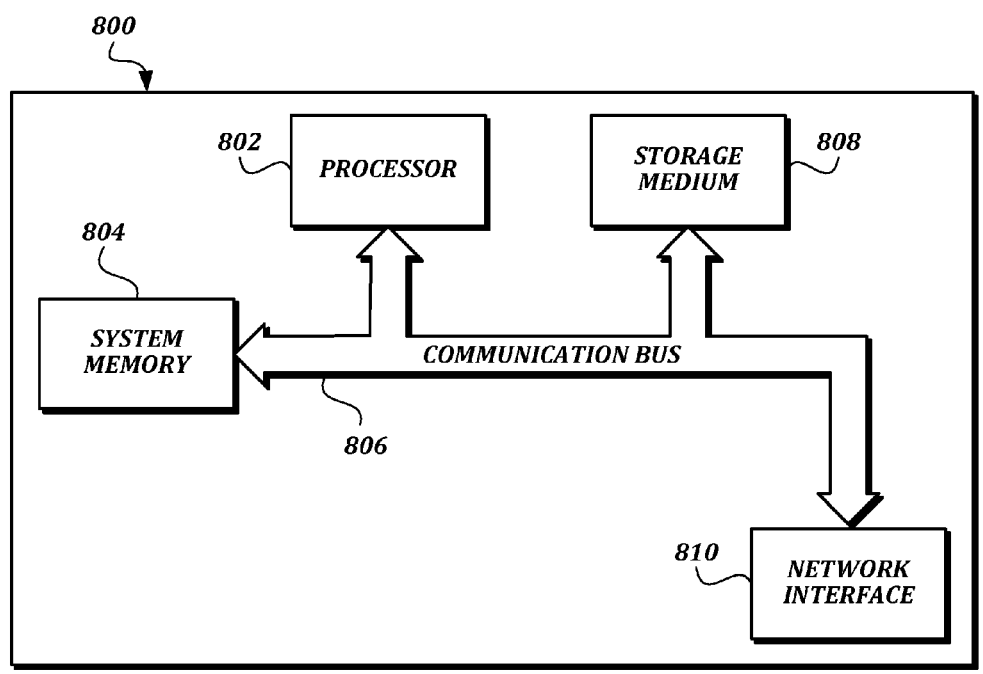
FIG. 8 is a block diagram that illustrates aspects of an exemplary computing device appropriate for use in accordance with embodiments of the present disclosure.

FIG. 8 is a block diagram that illustrates aspects of an exemplary computing device 800 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or other memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is optional. In any event, the storage medium 808 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 804 and storage medium 808 depicted in FIG. 8 are examples of computer-readable media.

For ease of illustration and because it is not important for an understanding of the claimed subject matter, FIG. 8 does not show some of the typical components of many computing devices. In this regard, the computing device 800 may include input devices, such as a keyboard, keypad, mouse, trackball, microphone, video camera, touchpad, touchscreen, stylus, and/or the like. Such input devices may be coupled to the computing device 800 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Multimedia input devices may include a video camera. A video camera, when active, may provide a stream of video data. As another example, multimedia input devices may include a microphone. A microphone, when active, may provide a stream of audio data. Input devices can be separate from and communicatively coupled to computing device 800 (e.g., a client device), or can be integral components of the computing device 800. In some embodiments, multiple input devices may be combined into a single, multifunction input device (e.g., a video camera with an integrated microphone). Any suitable input device either currently known or developed in the future may be used with described systems described herein.

The computing device 800 may also include output devices such as a display, speakers, printer, etc. The output devices may include video output devices such as a display or touchscreen. The output devices also may include audio output devices such as external speakers or earphones. The output devices can be separate from and communicatively coupled to the computing device 800, or can be integral components of the computing device 800. In some embodiments, multiple output devices may be combined into a single device (e.g., a display with built-in speakers). Any suitable output device either currently known or developed in the future may be used with described systems.

In any of the described examples, digital signal processors (which can be implemented in hardware, software, or some combination of hardware and software) can be used for processing media data such as audio data and video data. For example, a digital signal processing module can include encoders to encode and/or decoders to decode encoded data in formats such as MP3, Vorbis, AAC, HE-AAC, or Windows Media Audio (WMA) for audio, or MPEG-2/H.262, H.263, VC-1, or H.264 for video.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a storage medium) or computer storage device and be stored on and executed by one or more general-purpose or special-purpose processors, thus creating a special-purpose computing device configured to provide functionality described herein.

Extensions and Alternatives

Many alternatives to the described systems are possible. For example, the described systems can comprise multiple servers, client devices, and administrator devices, which can interact with the system one at a time or simultaneously.

Many alternatives to the illustrated techniques are possible. For example, processing stages in techniques described herein can be separated into additional stages or combined into fewer stages. As another example, processing stages in techniques described herein can be omitted or supplemented with other techniques or processing stages. As another example, processing stages illustrated as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a race management system comprising one or more computing devices, a computer-implemented method comprising:
   providing a user interface configured to receive interested/committed selections for races;
   recording the received interested/committed selections as data indicating interest in or commitment for one or more runners to run in the races;
   prioritizing the races for the one or more runners based on field size or race type;
   updating and displaying a race menu including races for at least one of the one or more runners, wherein the race menu displays one or more races for which the at least one runner is eligible and does not display one or more races for which the at least one runner is not eligible;
   updating and displaying an interested/committed list for the at least one runner, wherein the data indicating interest in or commitment for the one or more runners to run in the races can be obtained via the race menu or via the interested/committed list for the at least one runner;
   sending updates to a tentative entry list (TEL) database, wherein the updates are based on the interested/committed selections for the races and include modifications to field size information in the TEL database; and
   constructing a one-day TEL based at least in part on the field size information in the TEL database, wherein the interested/committed list is configured to indicate results of attempts to enter races by indicating whether races on the interested/committed list are on the one-day TEL.

2. A race management system comprising one or more computing devices each comprising a processing unit and computer-readable storage media having stored thereon computer-executable instructions configured to implement functionality of the race management system, the race management system being programmed to, at least:
   provide a user interface configured to receive interested/committed selections for races;
   record the received interested/committed selections as data indicating interest in or commitment for one or more runners to run in the races;
   prioritize the races for the one or more runners based on field size or race type;
   update and display a race menu including races for at least one of the one or more runners, wherein the race menu displays one or more races for which the at least one runner is eligible and does not display one or more races for which the at least one runner is not eligible;
   update and display an interested/committed list for the at least one runner, wherein the data indicating interest in or commitment for the one or more runners to run in the races can be obtained via the race menu or via the interested/committed list for the at least one runner;
   send updates to a tentative entry list (TEL) database, wherein the updates are based on the interested/committed selections for the races and include modifications to field size information in the TEL database; and
   construct a one-day TEL based at least in part on the field size information in the TEL database, wherein the interested/committed list is configured to indicate results of attempts to enter races by indicating whether races on the interested/committed list are on the one-day TEL.

3. The race management system of claim 2, wherein the interested/committed list for at least one of the one or more runners is located on a profile page.

4. The method of claim 1, further comprising receiving updates from the TEL database.

5. The method of claim 1, wherein the interested/committed list for the at least one runner is located on a profile page.

6. The race management system of claim 2, wherein the race management system is further programmed to receive updates from the TEL database.

7. The race management system of claim 2, wherein the one-day TEL comprises one or more protocol races.

8. The race management system of claim 2, wherein the one-day TEL comprises one or more alternate races.

9. The race management system of claim 8, wherein the alternate races are prioritized based at least in part on field size.

10. The race management system of claim 2, wherein the runners are horses.

11. The method of claim 1, wherein the one-day TEL comprises one or more protocol races.

12. The method of claim 1, wherein the one-day TEL comprises one or more alternate races.

13. The method of claim 12, wherein the alternate races are prioritized based at least in part on field size.

14. The method of claim 1, wherein the runners are horses.

15. One or more non-transitory computer-readable media having stored thereon computer-executable instructions comprising instructions configured to cause one or more computing devices to:
- provide a user interface configured to receive interested/committed selections for races;
- record the received interested/committed selections as data indicating interest in or commitment for one or more runners to run in the races;
- prioritize the races for the one or more runners based on field size or race type;
- update and display a race menu including races for at least one of the one or more runners, wherein the race menu displays one or more races for which the at least one runner is eligible and does not display one or more races for which the at least one runner is not eligible;
- update and display an interested/committed list for the at least one runner, wherein the data indicating interest in or commitment for the one or more runners to run in the races can be obtained via the race menu or via the interested/committed list for the at least one runner;
- send updates to a tentative entry list (TEL) database, wherein the updates are based on the interested/committed selections for the races and include modifications to field size information in the TEL database; and
- construct a one-day TEL based at least in part on the field size information in the TEL database, wherein the interested/committed list is configured to indicate results of attempts to enter races by indicating whether races on the interested/committed list are on the one-day TEL.

16. The non-transitory computer-readable media of claim 15, wherein the computer-executable instructions further comprise instructions configured to cause the one or more computing devices to receive updates from the TEL database.

17. The non-transitory computer-readable media of claim 15, wherein the interested/committed list for at least one of the one or more runners is located on a profile page.

18. The non-transitory computer-readable media of claim 15, wherein the one-day TEL comprises one or more protocol races.

19. The non-transitory computer-readable media of claim 15, wherein the one-day TEL comprises one or more alternate races prioritized based at least in part on field size.

20. The non-transitory computer-readable media of claim 15, wherein the runners are horses and wherein the races are horse races.

* * * * *

UNITED STATES PATENT AND TRADEMARK OFFICE
CERTIFICATE OF CORRECTION

| | | |
|---|---|---|
| PATENT NO. | : 9,717,983 B1 | Page 1 of 1 |
| APPLICATION NO. | : 14/206862 | |
| DATED | : August 1, 2017 | |
| INVENTOR(S) | : M. Pollowitz et al. | |

It is certified that error appears in the above-identified patent and that said Letters Patent is hereby corrected as shown below:

| Column | Line | Error |
|---|---|---|
| 4 | 49 | "smartphone," should read --smart phone,-- |
| 12 | 51 | "makes" should read --make-- |

Signed and Sealed this
Seventh Day of November, 2017

Joseph Matal
*Performing the Functions and Duties of the*
*Under Secretary of Commerce for Intellectual Property and*
*Director of the United States Patent and Trademark Office*